Patented Aug. 22, 1933

1,923,489

UNITED STATES PATENT OFFICE 1,923,489

SYNTHESIS OF UREA

Herbert J. Krase, Clarendon, Va., and Harry C. Hetherington, Washington, D. C.

No Drawing. Application June 27, 1928
Serial No. 288,796

4 Claims. (Cl. 260—125)

(Granted under the Act of March 3, 1883, as amended April 30, 1928; 370 O. G. 757)

This application is filed under the act approved April 30, 1928, and the invention herein described, if patented, may be manufactured and used by or for the Government; for governmental purposes, without the payment to us of any royalty thereon.

This invention relates to the formation of urea from ammonia and carbon dioxide, particularly to a method by which a high yield of urea may be obtained.

When carbon dioxide and ammonia or ammonium carbamate is heated in a closed vessel or autoclave, urea and water are formed, but as is well known, only a part of the materials undergo this conversion. When one employs ammonium carbamate for this urpose the conversion which is usually obtained depends among other things upon the temperature. The effect of temperature upon the conversion of ammonium carbamate has been determined by Matignon and Frejacques and the results published in Bulletin Societe Chim. XXXI, pp. 307 et 394 (1922). These authors have determined that 130° C. the average yield of urea at equilbrium was 39.2 per cent of the theory. At 140° C. they found that 41.3 per cent was converted and at 145°, 43.3 per cent was converted. At 150°, these authors estimate from the results mentioned above, that approximately 46.0 per cent should be converted to urea. The experiments of other workers, notably Krase and Gaddy, whose work is published in the Journal of Ind. and Eng. Chem., vol. 14, page 611 (1922) in general substantiate these results in so far as conversions of the order of 40 to 41 per cent are obtained.

Ae we have implied above, the effect of temperature is only one of the effects which influences the yield of urea when one starts with ammonium carbamate. Other well recognized effects are exerted, for example by the amount of water either free, or combined as ammonium carbamate, and also by the density of packing of the charge in the container. These effects are disclosed in the paper of Krase and Gaddy mentioned above, and elsewhere. So far as we are aware, no one has ever succeeded in obtaining a conversion of ammonium carbamate to urea of a greater degree than indicated by the figures mentioned above.

Now we have discovered a method by which increased amounts of urea may be obtained from ammonium carbamate. Our method consists in heating to temperatures ranging from 120° C. to 200° C. ammonium carbamate or other compounds of ammonia, carbon dioxide and water; in the presence of ammonia. This ammonia may vary from 5 to 300 or more per cent of the weight of the ammonia combined chemically with carbon dioxide. By this method we obtain a conversion of ammonium carbamate, ammonium carbonate or ammonium bicarbonate, greatly in excess of that known to the prior art. We can then remove the excess ammonia from the urea, carbamate, water, mixture by distillation at a lower temperature than the conversion temperature. The mixture remaining behind containing urea, ammonium carbamate and water is treated by any of the methods whereby urea may be separated from ammonium carbamate and which are well known to those skilled in the art. The ammonia removed by distillation may be liquefied by reducing the temperature or increasing the pressure or both, and again utilized by adding it to other carbamate in order to increase the conversion of this additional carbamate. We have found that by distilling the ammonia from the converted charge at a temperature in the neighborhood of 60° C. a fairly pure ammonia is obtained, in fact this ammonia may be employed to increase the conversion of additional and successive portions of carbamate.

So far as we are aware, previous to our work no one with the exception of Messrs. Fichter, Stieger and Stanisch have ever attempted to increase the yield of urea obtained from ammonium carbamate by means of heating with additional ammonia. Their work is reported in the Verhandlungen der Naturforschenden Gesellschaft, Basel vol. 28, p. 66 (1917). In Table XIV on page 99 of this volume, we find that in their experiments at 135° in which 4.5 grams of carbamate and 0.26 grams ammonia were heated at 135° C. for 24 hours, a conversion of 34.3 per cent was obtained while in another experiment in which ammonium carbamate alone was heated for the same length of time at the same temperature 35.5 per cent conversion was obtained. Consequently, we must conclude, from these experiments, that under these conditions, free ammonia exerts a harmful influence.

At a temperature of 125° C. in another experiment by these same workers, a conversion of 1.7 per cent was obtained in the absence of free ammonia, while a parallel experiment in which .26 grams of ammonia was present together with 4.5 grams of carbamate a conversion of 9.8 per cent was obtained. Here we see a slight improvement in the conversion. In another experiment in which 4.5 grams of carbamate was heated with 1 cc. of liquid $NH_3$ equivalent to .65 grams, a conversion of 14.1 per cent was obtained, a further improvement. In still another experiment in which the same amount of carbamate was heated with 2 to 3 cc. of liquid (equivalent to 1.3 to 1.95 grams ammonia) a conversion of 4.3 per cent was obtained. From these results, these authors conclude that a moderate amount of free ammonia is beneficial but that a larger amount of free ammonia is detrimental to the urea reaction probably because of a secondary reaction in which the free ammonia reacts with the urea to form guanidine.

Our experiments have shown that, contrary to what would be expected from the work of the above authors, no decrease in the conversion to urea occurs with increasing ammonia, but on the other hand we have shown that an actual increase in the conversion is obtained. Furthermore, we have found that no loss of urea occurs through the formation of guanidine under our conditions. We have also not been able to substantiate the findings of these authors that the influence of ammonia in increasing the yield of urea is greater at lower temperatures than at higher ones. On the contrary, we have found that the influence of free ammonia is extremely beneficial at much higher temperatures than was indicated by the work of these authors.

Our method of increasing the conversion of ammonium carbamate or mixtures of ammonia and carbon dioxide in the proportions of carbamate and containing free or combined water, or both, may be carried out in the following manner, although it is understood we do not wish to be limited to precise steps herein set forth.

To a charge of ammonium carbamate or carbon dioxide compounds of ammonia and water, either in the dry state or containing some free water, there is added an amount of ammonia equivalent in weight to not less than 5 per cent of the combined ammonia in the charge. The above charge is heated to 150° C. in a pressure resisting vessel, such as is ordinarily used in the synthesis of urea, additional strength being provided, however, to withstand the greater pressure which follows from the use of additional ammonia. The above charge is maintained at this temperature or thereabout until no further conversion to urea takes place, which, depending on the temperature may be five hours or less. We obtain, if 100 per cent excess of ammonia is used, a conversion to urea of 10 per cent of the ammonia combined as carbamate. If desired the conversion may be interrupted at any intermediate point. The temperature of the charge after the desired degree of conversion has been attained is dropped, the free ammonia is withdrawn, and may be utilized in a similar manner for conversion of additional batches of ammonium carbamate or carbonate.

The temperature to which the charge is dropped depends upon the length of time taken to distill the ammonia. In other words, the temperature of the charge should be dropped to a point at which there is no appreciable decomposition of urea during the distillation. This temperature range will be between 60° and 100° C. for a time of distillation ranging from 4 hours to 30 minutes when the expansion of the ammonia is allowed to proceed down to atmospheric pressure.

When the distillation of the ammonia proceeds at pressures greater than atmospheric a higher temperature is necessary. For example, it may be desirable to expand the ammonia into a condenser so that the liquid ammonia recovered can be utilized directly without compression. In this case, distillation of the excess ammonia would be made against pressures determined by the temperature of the cooling water in the condenser. Or if it is desirable, it may be expanded in two stages, the first stage being an expansion at such pressures that condensation is effected merely by cooling the gas, the second stage being an expansion against lower pressures, i. e., pressures between atmospheric pressure and the pressure utilized in the first stage. By means such as outlined above, it is possible to remove practically all the ammonia added to the carbamate.

It is also advantageous to utilize this invention when making urea continuously, as for example, when operating according to the disclosure of Hetherington and Krase, Ser. No. 91,832, filed March 2, 1926. In this disclosure it is proposed to so combine the urea synthesis process and the carbon dioxide recovery process so that the distillation of the carbon dioxide unconverted to urea in the former process and the distillation of the carbon dioxide containing solutions in the latter process are carried out in the same apparatus with consequent saving of energy. It is customary in operating this process to pump into the autoclave or urea converting vessel proportions of ammonia and carbon dioxide equivalent to the proportions of these compounds existing in ammonium carbamate, namely, two molecules of ammonia to one of carbon dioxide. With these proportions it is possible to obtain a conversion to urea of about 40 per cent of the theory. If one now employs an excess of ammonia, for example, of 100 per cent, i. e., four molecules of ammonia to one of carbon dioxide, one obtains a conversion at 150° C. in the neighborhood of 60 to 70 per cent of the theory based upon the ammonia combined with the carbon dioxide as ammonium carbamate.

The charge is then released from the autoclave and admitted to a still and the free ammonia recovered as in the previous example. The melt containing the urea and combined ammonia which latter may be present as ammonium carbamate, carbonate or other compounds is then treated for the recovery of the combined ammonia and carbon dioxide in any manner already known to the art. To the recovered ammonia and carbon dioxide is added additional ammonia and carbon dioxide to make up that combined as urea, and the gases reprocessed.

We have found that the amount of conversion of the carbamate ammonia for a given time and temperature depends upon the amount of free ammonia present. For example, we have found that at 155° an excess of 15 per cent produces a conversion of 50 per cent; an excess of 50 per cent a conversion of 60 per cent; an excess of 100 per cent a conversion of about 70 per cent, and an excess of 300 per cent a conversion of about 85 per cent. From this it will be seen that any conversion desirable, within the above limits, may be obtained by varying the proportion of excess ammonia.

What we claim is:

1. A method for producing yields of urea in excess of 43% based on the ammonia combined with the carbon dioxide, which comprises heating carbon dioxide compounds of ammonia with an excess of from 15% to 300% of ammonia to a temperature between 120° and 200° C., and in the substantial absence of inert gas.

2. A method for producing yields of urea in excess of 43% based on the ammonia combined with the carbon dioxide, which comprises heating carbon dioxide compounds of ammonia with an excess of from 15 to 300% of ammonia to a temperature between 120° and 200° C., and in the substantial absence of free nitrogen and hydrogen gases.

3. A method for producing yields of urea in excess of 43% based on the ammonia combined with the carbon dioxide, which comprises heating ammonium carbamate with an excess of from 15 to 300% of ammonia to a temperature between 120° and 200° C. and in the substantial absence of inert gases.

4. A method for producing yields of urea in excess of 43%, which comprises heating ammonium carbamate with an excess of from 15 to 300% of ammonia, to a temperature between 120° and 200° C., and in the substantial absence of free nitrogen and hydrogen gases.

HERBERT J. KRASE.
HARRY C. HETHERINGTON.